May 18, 1965 M. BROWN 3,184,731
DISPLAY APPARATUS HAVING DRUM INDICATORS CONTROLLED
BY INDIVIDUAL SYNCHRONOUS MOTORS
Original Filed Oct. 30, 1953 6 Sheets-Sheet 1

INVENTOR
MILTON BROWN
BY Geo. J. Hyde
ATTORNEY

INVENTOR
MILTON BROWN

INVENTOR
MILTON BROWN
BY
ATTORNEY

May 18, 1965 M. BROWN 3,184,731
DISPLAY APPARATUS HAVING DRUM INDICATORS CONTROLLED
BY INDIVIDUAL SYNCHRONOUS MOTORS
Original Filed Oct. 30, 1953 6 Sheets-Sheet 4

INVENTOR
MILTON BROWN
BY Geo. G. Hyde
ATTORNEY

INVENTOR.
MILTON BROWN
BY
ATTORNEY

United States Patent Office 3,184,731
Patented May 18, 1965

3,184,731
DISPLAY APPARATUS HAVING DRUM INDICATORS, CONTROLLED BY INDIVIDUAL SYNCHRONOUS MOTORS
Milton Brown, Glen Rock, N.J., assignor to The Bendix Corporation, a corporation of Delaware
Continuation of application Ser. No. 389,390, Oct. 30, 1953. This application Sept. 1, 1961, Ser. No. 137,937
2 Claims. (Cl. 340—315)

The present application is a continuance of U.S. application Serial No. 389,390, filed October 30, 1953, and now abandoned, by Milton Brown and assigned to the Bendix Aviation Corporation, now by change of name The Bendix Corporation.

The invention relates to electrically operated indicating systems and particularly to systems in which drum counter type indicators are used.

An object of the invention is to provide an improved arrangement for the electrical operation of one or more drum counter indicators located at a distance from a main indicator. One purpose is to provide novel means for the electrical actuation of remote counters and, in particular, an electrical system that will be simpler and less expensive than those now in use.

A further object is to eliminate the necessity for employing amplifiers and servomotors in the actuating circuits, and to employ synchros for the direct operation of remote indicators. This presents a serious problem, since the usual small synchro suitable for this purpose does not develop enough power for satisfactory operation of the usual drum counter mechanism. Another object of the invention is the origination of a counter construction that can be efficiently operated by low power synchros. This is accomplished in general by providing a novel drum structure, including a direct synchro mounting; and a specific feature is the mounting of one or more synchros within the drums of a counter so as to produce an efficient and compact arrangement in which the direct drive connection between a synchro and the associated drum makes it possible for the synchro to rotate such drum directly. A further feature of this construction is the independent operation of each drum.

A related object is the development of a novel drum counter having two independent drums, each directly rotated by a synchro within the drum; and in an improved form, the incorporation of additional drums, adapted for rotation either by a synchro or by other types of electrical actuating devices.

In some types of installation the last drum of the indicator, such as the hundreds drum in a three drum counter, will never be required to expose the higher digits. For instance, in automatic distance indicating systems for aircraft which show the number of miles to a destination, certain systems are not operative beyond two hundred miles, in which case the hundreds drum requires only the 0 (or a blank space) and the digit 1. In systems which operate up to four hundred miles, the hundreds drum requires only the digits 1, 2, and 3. A purpose of the invention is to provide a remote indicator arrangement suitable for such systems, which includes a simplified and less expensive construction than that which employs synchro drive for each drum, but which will impart to the hundreds drum of a remote indicator the limited movements which satisfy such systems.

When operating a receiver synchro to locate its rotor in various selected angular positions by providing the required voltages to the windings of the synchro stator, the accepted practice is to connect these windings in series with corresponding windings of the stator of a transmitter synchro, an arrangement commonly called "back to back," and thus locate the transmitter rotor, energized from the same source as the receiver rotor, in the desired positions. An object of the invention is to provide novel arrangements for applying the correct voltages to the receiver stator windings to locate the rotor in a desired sequence of positions. Related objects are to provide a switching system for this purpose; to accomplish the indicated objects in a simplified manner by grounding one stator winding; and to simplify the system by employing a phase reversing arrangement.

Another object is to provide a novel warning signal, operative to indicate failure of power or signals.

The foregoing and other objects and advantages of the invention will appear more fully hereafter from consideration of the detailed description which follows, considered in conjunction with the accompanying drawings, in which one embodiment of the invention and certain modifications thereof are illustrated. It is to be expressly understood, however, that the drawings are for the purposes of illustration and description and are not to be construed as defining the limits of the invention.

Referring now to the drawings for a more detailed showing of a novel distance indicating system embodying the invention:

Figure 1:
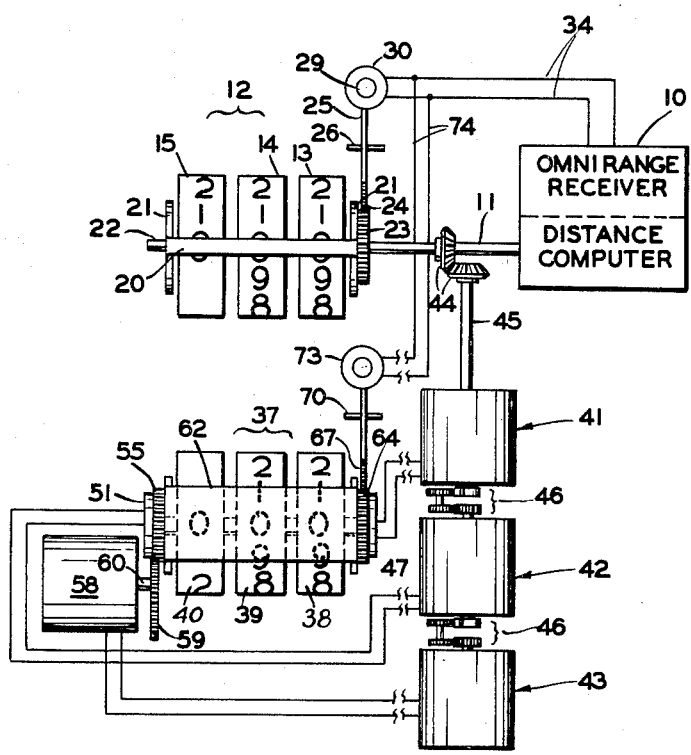
FIG. 1 is a schematic diagram of a distance indicating system, including a main drum counter indicator, a similar remote indicator, and an arrangement for actuating the latter indicator.
Figure 2:
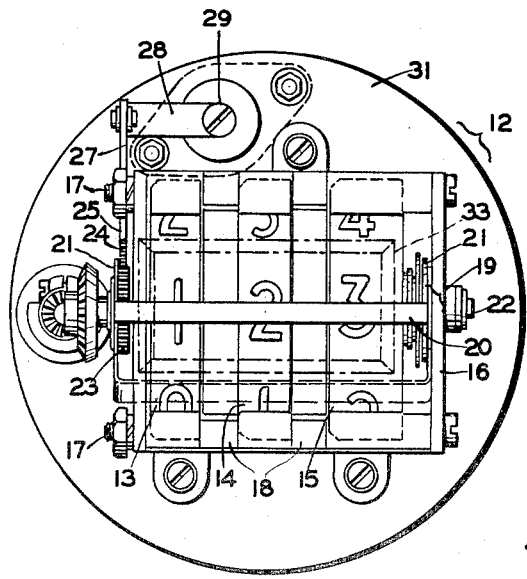
FIG. 2 is a front elevation of the main indicator, showing a warning signal in operative position.
Figure 3:
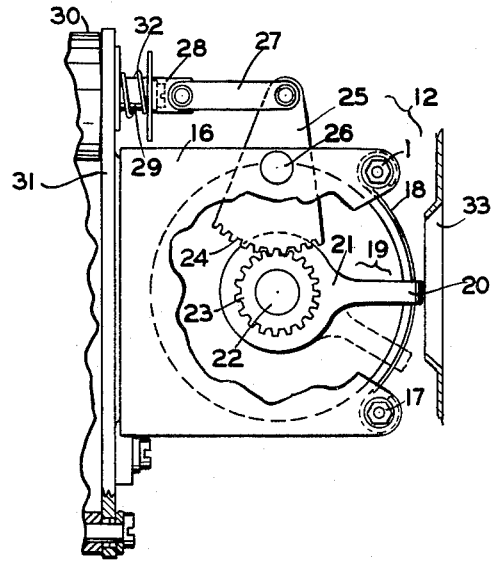
FIG. 3 is an end elevation of the main indicator.
Figure 4:
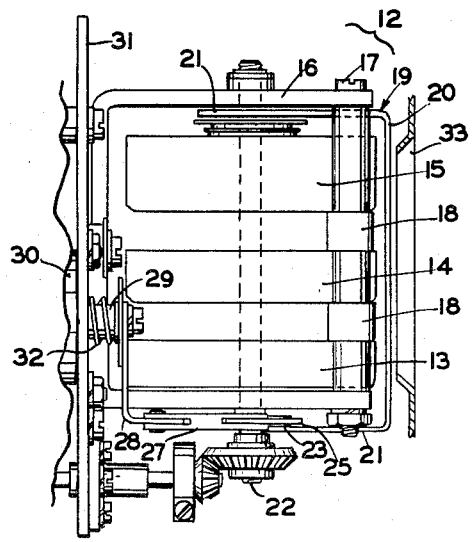
FIG. 4 is a top view of the main indicator.

Referring first to FIG. 1, the invention is illustrated in its application to an automatic distance indicating system of established type widely used on aircraft, which receives beacon signals from an omnirange transmitter, automatically computes the distance to the transmitter and operates a drum counter indicator to show at all times the distance in miles between the aircraft and the transmitter. This arrangement includes a receiver and distance computer 10, which operates through shaft 11 a standard type of drum counter 12. The receiver and computer are so well known that they are shown only diagrammatically. The indicator 12 has the usual units drum 13, tens drum 14 and hundreds drum 15, with interposed Geneva movement drive of standard type, not shown. The indicator 12 is carried by a U-shaped mounting plate 16 (FIGS. 2–4) provided at the front with bolts 17 and shielding strips 18 having end portions curved around bolts 17 and central portions extending across the spaces between and in close alignment with the surfaces of drums 13, 14, 15, arranged to hide the actuating mechanism between the drums.

A signal is provided on the main indicator 12 for warning the observer when power failure, or the weakness or lack of signals picked up by receiver 10, prevents said receiver from operating properly the indicator 12, in which case the mileage shown thereon would be an unreliable indication of the distance of the transmitter. In the form illustrated, this warning signal 19 comprises a metal strip 20 with inturned end portions 21 pivoted on the shaft 22 of the indicator 12. The strip 20 is located just above the drum surface, and may be swung into or out of position in line with the visible numerals on the drums, being advantageously painted a bright color to attract attention. In the form illustrated in FIGS. 2, 3 and 4 the signal strip 20 is narrow and permits observation of the numerals at all times.

Means actuated by the power in the receiver 10 is provided for swinging signal 19 into and out of operative position. In the form illustrated in the latter figures, a pinion 23 fixed to a signal strip end portion 21 meshes with a gear sector 24 on a lever arm 25 mounted on pivot 26 carried by the mounting plate 16, arm 25 having an end pivoted to extension 27 of L-shaped arm 28 attached to the plunger 29 of solenoid 30. The solenoid and the mounting plate 16 are attached to frame plate 31. A spiral spring 32 bearing against plate 31 and arm 28 is arranged to swing the lever arm 25 normally into position where the signal strip 20 overlies the visible numerals on the indicator 12.

When solenoid 30 is energized it retracts plunger 29 against the pressure of spring 32, swinging the signal strip 20 laterally out of view through window 33. The solenoid energizing circuit 34 (FIG. 1) extends to the receiver 10, and is connected in series with the signal circuit therein, so that if the signal becomes too weak to operate indicator 12 properly, or is missing, or if the power should fail and prevent any signal output, solenoid 30 would be de-energized, permitting spring 32 to shift signal 19 into operative position. Moreover, the signal will retain such position after the receiver 10 is initially turned on until the receiver has heated up and is operating with enough power to position indicator 12 properly, so that premature reading of the indicator is prevented.

It is generally important to provide a plurality of auxiliary indicators, located at various points distant from the main indicator 12 and which will at all times have the same reading, a system that is necessary in larger aircraft, for instance. An improved arrangement for operating remote indicators of this type is shown. Referring again to FIG. 1, a remote drum type indicator 37 is provided with a units drum 38, a tens drum 39, and a hundreds drum 40 corresponding to drums 13, 14 and 15 of the main indicator 12. As a standard type of drum counter is generally used for the indicator 37, a servo having sufficient power to drive the indicator would be required, together with a servo operating circuit which would include an amplifier to furnish the necessary operating energy. This is avoided by providing at the main indicator 12 a remote indicator drive including an electrical actuating element for each of the drums of the remote indicator 37, and at the remote indicator 37 a separate drive for each of said drums operated by one of said elements. The actuating elements 41, 42 and 43 are driven from shaft 11, as by bevel gears 44 and shaft 45. These elements may be synchros connected through step drive gearing 46, which may be of the mutilated gear type rotating in unison with the general drive of the drums of the main indicator 12, so that the rotor of the tens synchro 42 will shift 1/10 of a revolution for each revolution of units synchro 41 attached to shaft 45, and the rotor of synchro 43 will move 1/10 of a revolution for each revolution of the tens synchro 42. Obviously other well known drive arrangements may be employed.

Figure 5:
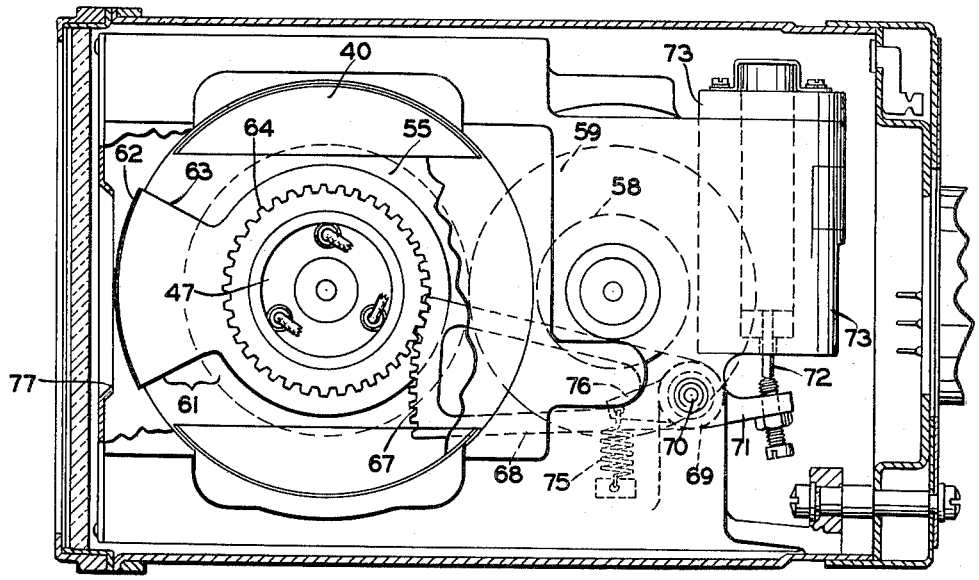
FIG. 5 is an end elevation of the remote indicator counter and actuating devices with the casing removed, shown in central vertical section.
Figure 6:
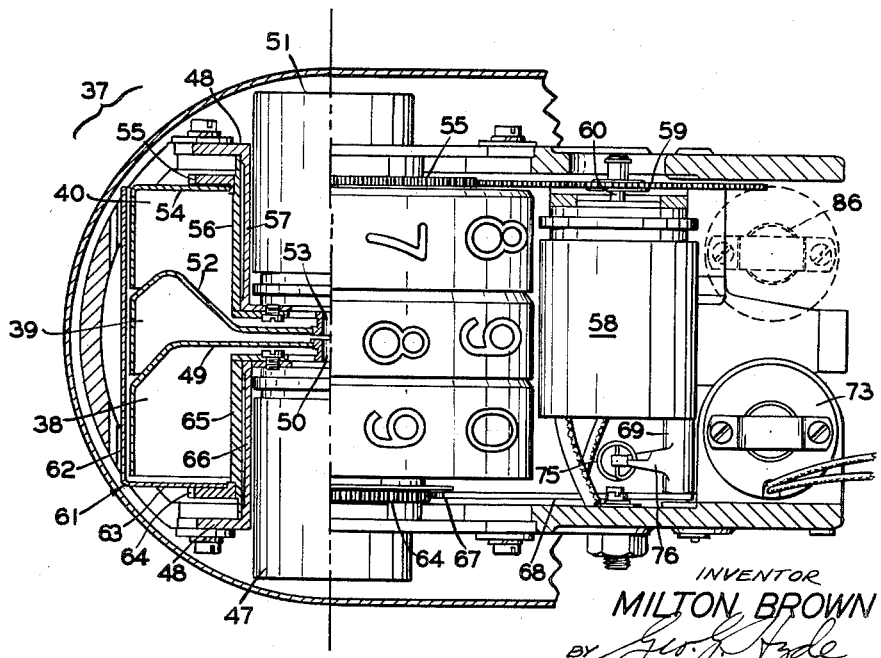
FIG. 6 is a top view of said remote indicator with the casing and the left half of the drum counter shown in central horizontal section.

The drums 38, 39 and 40 of remote indicator 37 are independently mounted, and each is connected to and rotated by a drive element electrically actuated by the corresponding synchro 41, 42, or 43. In the form illustrated, as shown in FIGS. 5 and 6, a units drive synchro 47 is mounted in the frame 48 of the remote indicator 37, coaxial with and extending into the units drum 38, whose transverse flange 49 is mounted on the shaft 50 of the rotor of synchro 47, said flange advantageously being deflected axially so that it lies close to the longitudinal center of the indicator 37. The tens drive synchro 51 is similarly mounted on frame 48, extending axially into the frame; and the central flange 52 of the tens drum 39, which is bent to lie in about the longitudinal center of the indicator 37, is mounted on the rotor shaft 53 of synchro 51.

The hundreds drum 40 has a centrally apertured end flange 54 rotatably mounted on the frame 48. In the form illustrated a flat ring gear 55 is fixed to flange 54 and to cylinder 56, rotatably fitted around a cylindrical bearing 57 on frame 48.

A suitable hundreds drum drive element, engaging ring gear 55, is provided. In the arrangement illustrated in FIGS. 5 and 6 this element comprises a synchro 58 mounted on the frame 48 and having a pinion 59 on its rotor shaft 60 engaging the ring gear 55.

In this embodiment the units drive synchro 47, actuated by units transmitter synchro 41, will rotate the remote indicator units drum 38 in synchronism with the main indicator units drum 13; the tens drive synchro 51, actuated by tens transmitter synchro 42, will rotate the remote indicator tens drum 39 in synchronism with main indicator tens drum 14; and the hundreds drive synchro 58, actuated by hundreds transmitter synchro 43, will rotate the remote inidcator hundreds drum 40 in synchronism with the main indicator hundreds drum 15. In this manner all movements of the main indicator drive shaft 11 will operate the remote indicator 37 in exactly the same way as the main indicator 12.

A device having the double function of a shield and a warning signal is likewise provided for the remote indicator 37, and operates in the same manner as the signal on the main indicator. It comprises a signal and shield structure 61 including a strip 62 with an inturned end 63 on which is mounted ring gear 64 fixed to cylinder 65 rotatably supported by cylindrical bearings 66 on the frame 48. A gear sector 67 meshing with ring gear 64 is mounted on lever arm 68 fixed to pivot block 69 rocking on pivot 70 on frame 48, and fixed at its other end to rocking arm 71 engaging plunger 72 of solenoid 73, whose winding is connected in parallel with the winding of the main indicator solenoid 30 through leads 74 (FIG. 1) and across the energizing circuit 34. A tension spring 75 engaging offset arm 76 of arm 71 normally biases the gear sector 67 into a position where the signal and shield strip 62 overlies the numerals on the drums of indicator 37, except when solenoid 73 is energized and rocks the gear sector 67 to shift the signal and shield member 62 into an invisible position rendering the indicia on drums 38, 39 and 40 visible to view through a window 77. In the form illustrated in FIGS. 5 and 6 the strip 62 is wider than in the form shown in FIGS. 2–4, so that it constitutes in effect a shutter which completely hides the drums and the numerals on the drums from view through the window 77, as shown in FIGURE 5, upon deenergization of the solenoid 73.

Figure 7:
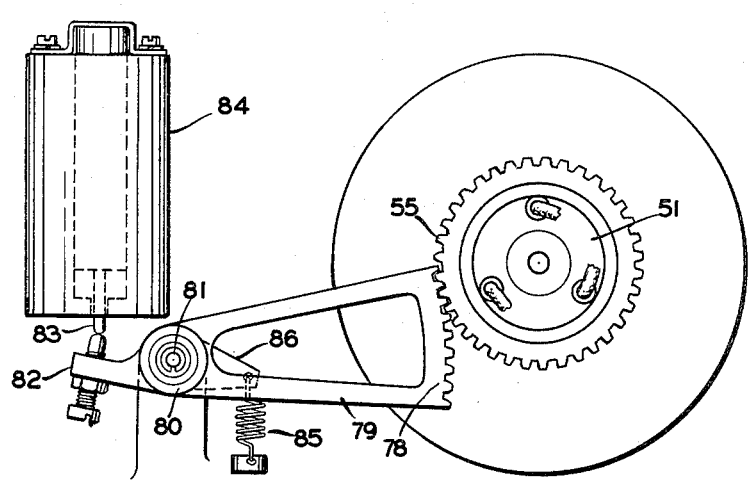
FIG. 7 is an end elevation of the remote indicator, similar to FIG. 5, showing an alternative construction.
Figure 8:
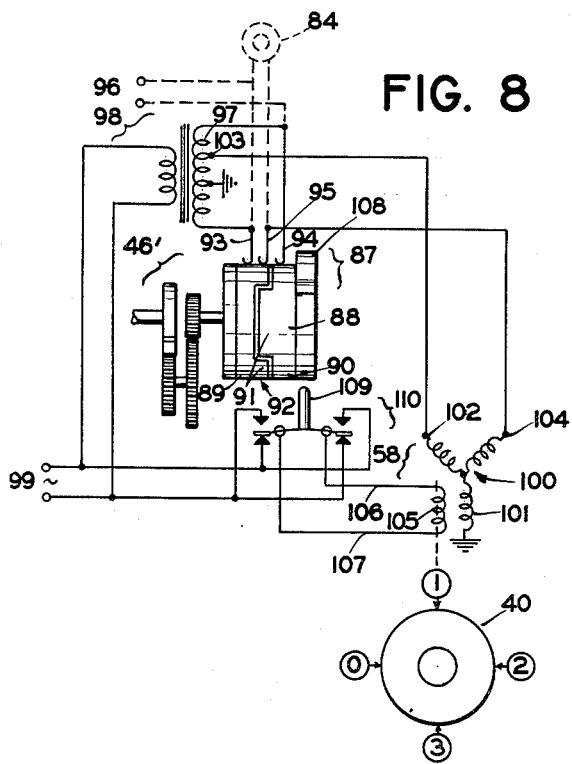
FIG. 8 is a diagram of drive arrangements for the hundreds drum of the remote indicator, including certain modifications.
Figure 9:
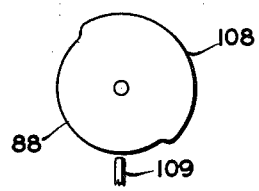
FIG. 9 is an end view of a switch cam in FIG. 8.

The structure illustrated in FIGURES 1 through 6 and including the novel drum counter with specific warning signal shutter means to shield the counter from view, upon the deenergization or failure of the counter operating circuit, is the subject matter of the present application, while the novel electrically controlled positioning means structurally shown in FIGURES 7, 8 and 9 is the subject matter of a U.S. application for patent, Serial No. 846,122, filed October 13, 1959, by Milton Brown, as a division of the U.S. application Serial No. 389,390, and assigned to Bendix Aviation Corporation.

Where only a limited number of digits on the hundreds drums will ever be used, as in the instances heretofore indicated, an arrangement is provided to replace synchro 43 for actuating the remote indicator hundreds drum 40 which is simpler and substantially less complicated and expensive than the synchro arrangement that has been described. One form of this arrangement employs in place of synchro 43 a rotary switch, and in place of the hundreds drive synchro 58 a simpler electrically actuated device for rotating the hundreds drum 40. In one embodiment of this arrangement, shown in FIGS. 7 and 8, the drive synchro 43 is replaced by a similarly mounted rotary switch, which turns the hundreds drum 40 through solenoid actuated gearing in the same general manner as that described in connection with the operation of signals 19 and 61.

The solenoid actuating arrangement is illustrated in FIG. 7, and is substantially the same as the signal operating mechanism shown in FIGS. 5 and 6. The ring gear 55 is engaged by a gear sector 78 on lever arm 79 fixed to pivot block 80 rotating on pivot 81 mounted on frame 48, block 80 carrying rocking arm 82, against which the plunger 83 of solenoid 84 bears. Gear sector 78 is normally biased by a spring 85 engaging arm 86 on pivot block 80 so as to maintain the gear sector 78 and hundreds drum 40 in the position where the blank space or 0 is visible through the window 77. When solenoid 84 is energized, the gear sector 78 is rocked to shift the drum 40 and bring the digit 1 into view.

A switch suitable for the proper energizing of solenoid 84 is rotatably mounted in place of synchro 43, and is driven by intermittent gearing 46'. The type of switch 87 shown in FIG. 8 will be described since it has certain advantages that will appear hereafter. In this construction a block 88 is provided on its cylindrical face with two annular metal conducting strips 89, 90 having contact teeth 91 extending alternately in spaced relation into a central contact zone 92. Strips 89 and 90 are insulated, as by forming block 88 of insulating material. Sliding contact connections with strips 89 and 90 are provided. As shown, brush 93 maintains engagement with strip 89, brush 94 with strip 90, and brush 95 is located in the zone 92 in contact with the teeth 91. Brushes 93 and 94 are connected across a suitable source of electrical energy. When switch 87 is used to operate solenoid 84, brushes 93 and 94 are connected across a D.C. potential source 96, this arrangement being indicated in dash lines.

Hundreds drum 40 may likewise be rotated through synchro 58 by a simpler circuit arrangement which can be adapted to different requirements as to the numerals which are to be displayed by the drum, and which eliminates the use of synchro 43. An arrangement of this type, suitable for positioning drum 40 to display either the zero space or the numeral 1, is shown in FIG. 8. In this arrangement the ends of secondary 97 of the transformer 98, energized from A.C. source 99, are connected to brushes 93 and 94, as shown. Stator 100 of synchro 58 has winding 101 grounded, winding 102 connected to an intermediate point 103 of secondary 97, the center point of which is grounded, and the third winding 104 connected to brush 95. With this arrangement the voltage applied to stator winding 104 will alternate between the voltages at the ends of transformer secondary 97, while the voltages at windings 101 and 102 remain fixed. This will create two separate fields for rotor 105 of synchro 58, connected to source 99 by leads 106 and 107; and the voltages are selected so that these fields will be at right angles, as hereafter explained. Under these conditions rotor 105 and drum 40 will alternate between two positions at right angles to each other; and by locating the zero or blank space and the numeral 1 at appropriate points on drum 40, these points will be properly located in visible position as the switch 87 rotates.

Under certain conditions it is desirable to expose more than two digits on drum 40. In one aerial navigation system in present operation, four positions are required, carrying the digits 0, 1, 2 and 3 respectively. In one arrangement suitable for this type of system, illustrated in FIGS. 8 and 9, the cylindrical block 88 is provided with a cam surface 108 arranged to engage the plunger 109 of a standard plunger-actuated reversing microswitch 110 inserted in leads 106 and 107 from rotor 105. Cam 108 is located so that it will engage switch plunger 109 and throw switch 110 when block 88 rotates one step after the numeral 1 has been displayed on drum 40. This will reverse the phase of the voltage applied to rotor 105 during the next two steps, when digits 3 and 4 are displayed, so that the positions of rotor 105 will be 180° offset from its positions during the two preceding steps.

The switch 87 is arranged for the described type of operation, having four equal contact teeth 91, the cam 108 being circumferentially aligned with two consecutive teeth which locate rotor 105 and drum 40 in positions for display of the digits 3 and 4. Drive gearing 46' is therefore constructed in known manner to rotate switch 87 through 90° for each revolution of tens drum 39. It will be evident, however, that this switch system is equally adapted to the location of rotor 105 in a greater number of positions by providing additional contacts for the brushes, connected to the proper voltages.

Figure 10:
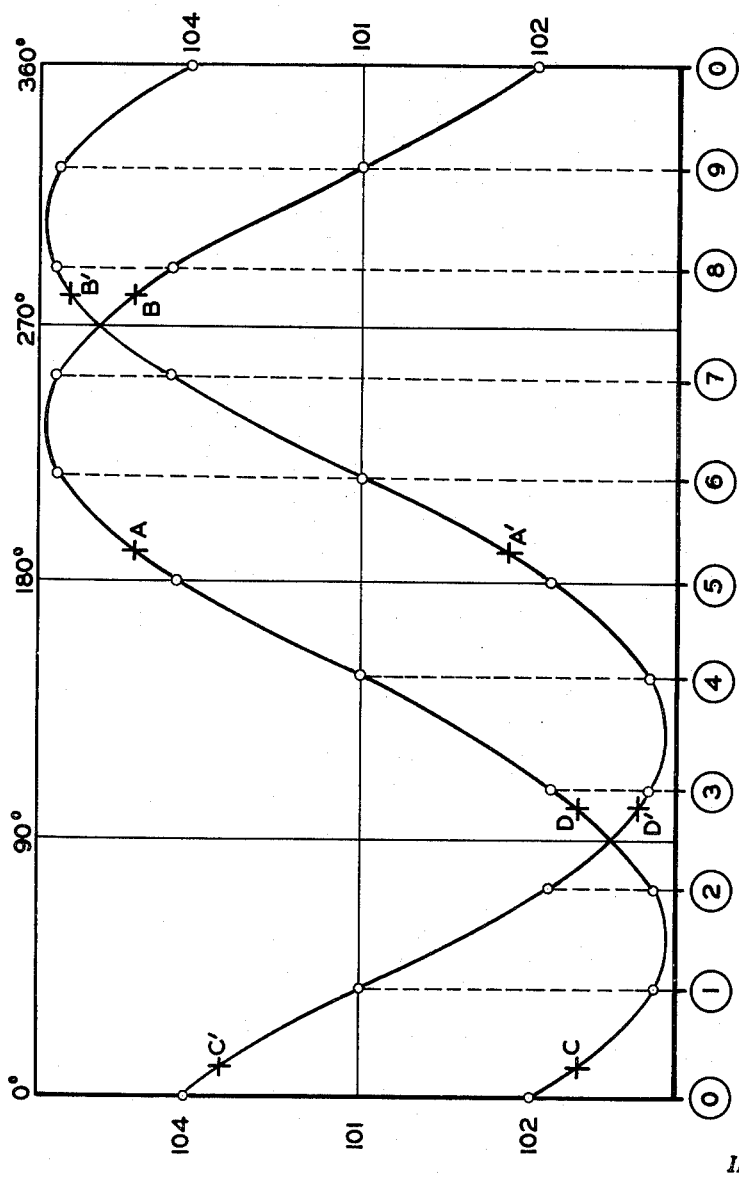
FIG. 10 is a graph of voltages of synchro stator windings for different rotor positions.

The voltages applied to each of the three windings of stator 100 in order to position rotor 105 and its associated hundreds drum 40 in a sequence of selected positions, such as those that have been described, can be determined by calculating the relative voltages to be applied to windings 102 and 104, when winding 101 is grounded, to produce resultant fields that will locate rotor 105 in any desired angular position, in accordance with formulas known to those skilled in this art. The voltage relationships of the windings under these conditions throughout a complete revolution of rotor 105 is a sine function, as indicated in FIG. 10. From this figure it will be evident that in the first arrangement described, two positions of rotor 105, offset by 90°, can be obtained by properly locating point 103 on the transformer secondary 97, and by designing this secondary to have the proper voltages at its terminals. These two positions are indicated on the FIG. 10 graph by the letters A, A' and B, B' respectively. It will also be evident from this figure that by reversing the phase of the voltage applied to rotor 105, its two succeeding positions, indicated by C, C' and D, D' on FIG. 10, will be offset 180° from its two initial positions.

Figures 11, 12:
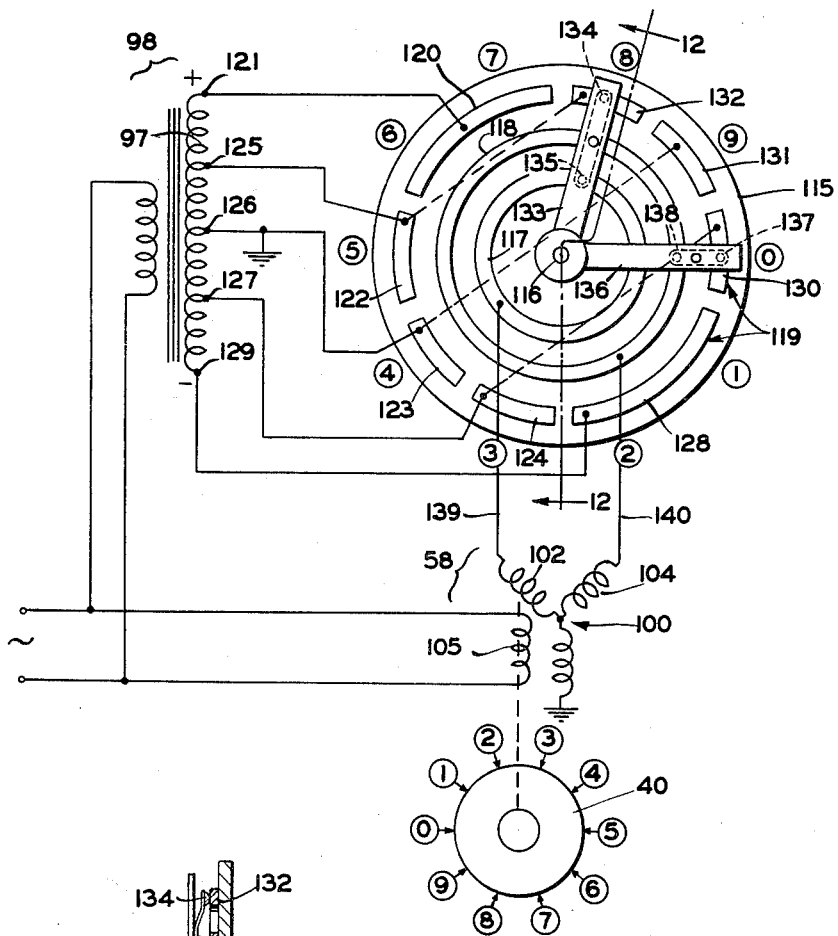
FIG. 11 is a diagrammatic face view of another form of hundreds drum drive.
FIG. 12 is a vertical central section through the switch structure shown in FIG. 11.

Other switching arrangements may be utilized for applying to windings 102 and 104 the proper voltages for locating rotor 105 and drum 40 in any desired sequence of positions, either directly or by using a reversing switch for simplification purposes in the manner already illustrated, taking advantage of the fact that the two halves of the voltage curve for each winding of the stator 100 are identical except for reversal of phase. One generalized arrangement of this type is illustrated in FIGS. 11 and 12, designed to locate drum 40 in ten successive equally spaced positions for the display of the digits zero through nine. In this embodiment stationary switch disk 115 is mounted in place of block 88, with the drive shaft 116 from gearing 46 journaled in disk 115, said gearing 46 being of the standard ten step type. Mounted on the disk face are inner contact ring 117 and outer contact ring 118 concentric with shaft 116. Sectors in an outer series 119, concentric with said shaft, are connected to appropriate points on transformer secondary 97.

Ten equally spaced sector positions are provided in this arrangement; but two opposite pairs of sectors are joined to form longer sectors for reasons hereafter indicated. Long sector 120 is connected to point 121 at one end of secondary 97. Short sectors 122, 123 and 124 are connected respectively to the upper intermediate point 125, center grounded point 126 and lower intermediate point 127 on secondary 97, while the other long sector 128 is connected to the lower secondary terminal 129.

The remaining 3 short sectors 130, 131 and 132 are cross-connected respectively to sectors 124, 123 and 122.

Shaft 116 carries contact arm 133, on which is mounted a brush 134 positioned to engage sectors 119, and a brush 135 bearing against inner contact ring 117, the brushes being electrically connected. A second contact arm 136 fixed to shaft 116 carries brush 137 arranged to contact sectors 119, and electrically connected brush 138 bearing against outer contact ring 118. Inner ring 117 is connected to stator winding 102 through lead 139, while outer ring 118 is connected to stator winding 104 through lead 140.

The arrangement illustrated will locate rotor 105 and the hundreds drum 40 in ten equidistant positions for the display of the ten digits, as already indicated; and the illustrated position of contact arms 133 and 136 is that at which the digit zero will be exposed. The voltages at the points 121, 125, 126, 127 and 129 on secondary 97 are selected to maintain the proper relationships between the voltages of the three windings of stator 100 in order to locate rotor 105 properly in the indicated locations; and these positions for the various digits have been indicated on the graph of FIG. 10, and in FIG. 11.

It will be noted that the voltages for successive positions at the peaks of the curves will be the same. Consequently the corresponding sectors are combined to form the long sectors 120 and 128; and the voltages at the three points following each peak are reproduced in inverse order following the next peak. This relationship is the basis for the cross-connection of the shorter sectors 119, and for the possible use of a reversing switch in the manner already indicated. Moreover, the two curves for windings 102 and 104 respectively are identical, except for their offset positions, and the angle between arms 133 and 136 is selected to correspond to the angular distance by which these curves are electrically offset.

While the embodiment shown in FIGS. 11 and 12 produces ten drum positions, it is evident that it can be utilized to position rotor 105 in any sequence of positions, simply by connecting sectors 119 to points having the proper voltage values on secondary 97 or other source of variable voltage. Moreover, these rotor positions need not be equally spaced, nor need they involve rotation always in the same direction.

Although but one main embodiment of the invention has been illustrated and described in detail, together with certain modifications of parts thereof, it is to be expressly understood that the invention is not limited to the specific disclosure. Various additional changes may be made in the design and arrangement of the parts without departing from the spirit and scope of the invention as the same will now be understood by those skilled in the art.

I claim:

1. For use in an electrical indicator control system, a drum indicator comprising a frame, a series of three coaxial rotatable drums bearing indicia thereon and mounted on the frame, and drum rotating apparatus arranged to bring selected indicia into viewing position, including a synchro mounted on the frame at one end of the series and extending into one of said drums, said synchro having a rotor engaging one of the drums, another synchro mounted on the frame at the other end of the series and extending into another of said drums, said other synchro having a rotor engaging another drum, a third synchro having a rotor and a drive element engaging the rotor of the third synchro with the third drum, a window through which the indicia of said drums may be visible, a shutter member pivotally mounted concentrically with said drums and normally positioned relative to said window so as to completely shield said indicia from view through said window, motor means carried by said frame, and a source of electrical energy to effectively energize said motor means upon the indicator control system being in an operative condition, said motor means connected to the shutter member and arranged to cooperate with the indicia bearing drums so as to shift said member out of said normal shield position in response to the effective energization of said motor means so that said selected indicia on said drums are thereupon rendered effective and visible through said window so long as the indicator control system continues in said operative condition.

2. For use in an electrical indicator control system, a drum indicator comprising a frame, a series of three coaxial rotatable drums bearing indicia thereon and mounted on the frame, and drum rotating apparatus arranged to bring selected indicia into viewing position, including a synchro mounted on the frame at one end of the series and extending into one of said drums, said synchro having a rotor engaging one of the drums, another synchro mounted on the frame at the other end of the series and extending into another of said drums, said other synchro having a rotor engaging another drum, a third synchro having a rotor and a drive element engaging the rotor of the third synchro with the third drum, a window through which the indicia of said drums may be visible, a shutter member pivotally mounted concentrically with said drums and normally positioned relative to said window so as to at least partially shield said indicia from view through said window, motor means carried by said frame, and a source of electrical energy to effectively energize said motor means upon the indicator control system being in an operative condition, said motor means connected to the shutter member and arranged to cooperate with the indicia bearing drums so as to shift said member out of said normal shield position in response to the effective energization of said motor means so that said selected indicia on said drums are thereupon rendered effective and visible through said window so long as the indicator control system continues in said operative condition.

References Cited by the Examiner

UNITED STATES PATENTS

| | | | |
|---|---|---|---|
| 862,209 | 8/07 | Sohm | 340—324 |
| 938,830 | 11/09 | Dawson | 340—325 |
| 2,074,066 | 3/37 | Wheeler et al. | 340—325 |
| 2,664,558 | 12/53 | Konet et al. | 340—253 |
| 2,697,348 | 12/54 | Bevins | 340—315 X |

NEIL C. READ, *Primary Examiner.*

IRVING SRAGOW, *Examiner.*